(12) United States Patent
Srivastava

(10) Patent No.: US 7,774,227 B2
(45) Date of Patent: Aug. 10, 2010

(54) METHOD AND SYSTEM UTILIZING ONLINE ANALYTICAL PROCESSING (OLAP) FOR MAKING PREDICTIONS ABOUT BUSINESS LOCATIONS

(75) Inventor: Ashok N. Srivastava, Mountain View, CA (US)

(73) Assignee: Saama Technologies, Inc., Campbell, CA (US)

( * ) Notice: Subject to any disclaimer, the term of this patent is extended or adjusted under 35 U.S.C. 154(b) by 416 days.

(21) Appl. No.: 11/852,601

(22) Filed: Sep. 10, 2007

(65) Prior Publication Data
US 2008/0208652 A1    Aug. 28, 2008

Related U.S. Application Data

(63) Continuation-in-part of application No. 11/710,093, filed on Feb. 23, 2007.

(51) Int. Cl.
*G06F 17/00* (2006.01)
(52) U.S. Cl. ........................................ 705/10
(58) Field of Classification Search .................. 705/10
See application file for complete search history.

(56) References Cited

U.S. PATENT DOCUMENTS

2002/0152092 A1* 10/2002 Bibas et al. ................ 705/1

OTHER PUBLICATIONS

Giovis, Jaclyn; Finding your place; Jun. 19, 2006; Knight-Ridder Tribune Business News—Sun-Sentinel-Fort Laude; dialog copy.*

* cited by examiner

*Primary Examiner*—Thomas Dixon
(74) *Attorney, Agent, or Firm*—Kevin H. Fortin

(57) ABSTRACT

A method and system that utilizes OLAP and supporting data structures for making predictions about business locations. The method includes providing a spatial map and analyzing heterogeneous data having a spatial component to find utilizable data. Relationships are automatically extracted from the utilizable data by employing machine learning. The step of automatically extracting relationships includes generating a composite indicator, which correlates spatial data with unstructured data. The extracted relationships are presented on a spatial map to make a prediction about at least one business location. Preferably, the predictions are presented as a rank-ordered list on the spatial map and a heat map overlays the spatial map to indicate predictions about particular regions.

3 Claims, 16 Drawing Sheets

| Nodes | Step: -3 | Step: -2 | Step: -1 | Step: 0 | Step: +1 | Step: +2 | Step: +3 |
|---|---|---|---|---|---|---|---|
| Node 00 | [women: 0, men: 5] | [0, 5] | [10, 25] | [0, 0] | [20, 10] | [0, 20] | [10, 10] |
| Node 01 | [0, 0] | [0, 0] | [5, 0] | [100, 100] | [0, 0] | [0, 0] | [0, 0] |
| Node 02 | [0, 0] | [0, 5] | [0, 0] | [0, 0] | [0, 50] | [0, 5] | [0, 0] |
| Node 03 | [0, 0] | [0, 0] | [0, 0] | [0, 0] | [15, 0] | [10, 0] | [0, 0] |
| Node 04 | [0, 0] | [0, 5] | [5, 0] | [0, 0] | [5, 0] | [0, 0] | [0, 0] |
| Node 05 | [0, 0] | [0, 10] | [0, 0] | [0, 0] | [10, 0] | [0, 25] | [25, 0] |
| Node 06 | [0, 5] | [10, 5] | [5, 25] | [0, 0] | [20, 25] | [10, 20] | [0, 10] |
| Node 07 | [0, 0] | [0, 0] | [0, 0] | [0, 0] | [10, 0] | [50, 5] | [15, 20] |
| Node 08 | [0, 0] | [0, 0] | [75, 50] | [0, 0] | [0, 0] | [0, 0] | [0, 10] |
| Node 09 ENTER | [100, 90] | [90, 75] | [0, 0] | [0, 0] | [10, 15] | [25, 25] | [0, 0] |
| Node 10 EXIT | [0, 0] | [0, 0] | [0, 0] | [0, 0] | [0, 0] | [0, 0] | [50, 50] |

Step

| | | -3 | -2 | -1 | 0 | 1 | 2 | 3 |
|---|---|---|---|---|---|---|---|---|
| | Node 00 | 0 | 0 | 50 | 0 | 6 | 1 | 1 |
| | Node 01 | 0 | 50 | 0 | 0 | 1 | 2 | 11 |
| Node | Node 02 | 50 | 0 | 0 | 0 | 5 | 8 | 22 |
| | Node 05 | 0 | 0 | 0 | 50 | 3 | 9 | 6 |
| | Node 11 | 0 | 0 | 0 | 0 | 7 | 9 | 12 |

FIG. 10

METHOD AND SYSTEM UTILIZING ONLINE ANALYTICAL PROCESSING (OLAP) FOR MAKING PREDICTIONS ABOUT BUSINESS LOCATIONS

PRIORITY CLAIM

This application is a continuation-in-part of U.S. patent application Ser. No. 11/710,093, filed on Feb. 23, 2007.

FIELD OF THE INVENTION

The present invention relates to systems and methods for making predictions about business locations.

BACKGROUND OF THE INVENTION

Choosing an optimal location may be a critical issue for numerous businesses including businesses involved in retail, manufacturing, franchising, and housing. Numerous factors may contribute to the choice of the eventual location of a business. These factors include, traffic flow, parking, real estate availability, cost, appearance, customer demographics and spending patterns, location of competitors, location of anchor businesses (i.e., businesses that attract customers that would be suitable for one's own business), barriers to traffic flow, and zoning. Currently, most companies use human insight and experience to combine these heterogeneous factors into a prediction regarding optimal business locations. Tables, spreadsheets, and experts are typically used to support the determination. However, even sophisticated retailers and fast-food companies may find that business location selection remains primarily a human endeavor.

There are a number of drawbacks to relying on traditional methods of business location selection. First, some businesses desire to have a clearly an articulated method to select their numerous business locations. The method is ideally applied uniformly so that methodology errors can be uniformly corrected.

Second, even with carefully articulated methods, human bias can introduce uncertainty and problems surrounding location selection. Biased, in this sense, means decisions are based in some measure on individual opinion and perception instead of actual data.

Third, since volumes of data is available, the process of analyzing data and choosing optimal locations based on the available data can be arduous and time consuming, which limits a decision-maker's ability to choose numerous optimal business locations within a short period.

Fourth, even where useful information is analyzed, it must be conveyed to a decision-maker. Sometimes the conclusions resulting from human efforts to analyze heterogeneous data is presented in a format where relationships between various pieces of data can be missed, resulting in less than optimal decision making.

Websites have presented spatial maps with an overlying heat map to display residential housing values. This presents home value data to a user in a simple and easily understood way. Varied colors indicate the average value for regions having a same color. Particular locations under investigation may be indicated with an icon. Clicking on the icon divulges more detailed information about the particular location. Real estate experts as well as casual information seekers can use this site. Although a wealth of data is presented in a user-friendly format, the data does not make any predictions.

A better way of choosing business locations is desired. Particularly, a way of choosing business locations, which is fast, utilizes numerous heterogeneous data sources, and consistently facilitates the making of useful business location choices is desired. It is also desired to have a decision support system that helps people select and otherwise make decisions about particular business locations. It is further desired to have a system that is easy to use.

SUMMARY

The present invention solves several problems to enable people to make business decisions about geographical locations utilizing volumes of available data. Normally, the resolution and quality of data are issues to be addressed. Heterogeneity of data sources may also be a problem. Heterogeneity in this context, means using various data types including structured data (e.g. in the form of tables), unstructured data (e.g. in the form of free-text narratives), semi-structured data, and spatial data. The present invention provides a method and system that are capable of combining above and other types of data and enable making of predictions about optimal business locations in a spatial environment.

One aspect of the invention automatically identifies and combines heterogeneous data sources to provide a rank-order list of possible locations in a spatial region. Another aspect of the invention utilizes composite indicators, which are complex mathematical functions of the original input data. The composite indicators may be a function of input data having any of a number of heterogeneous forms. An additional aspect of the invention includes utilization of sophisticated methods for analyzing the performance of the models. Appropriate dimensionality reduction techniques are also an aspect of the invention.

The methods and system of the present invention enable the presentation of complex data in a useful and user-friendly form to enable predicting something about a business location. The present invention includes a method including steps of analyzing heterogeneous data sources to find utilizable data, extracting one or more composite indicators from the utilizable data, and using the composite indicators to make a prediction about at least one business location. Preferably, the prediction is made and then presented on a heat map. The heat map may overlay, or be included within, a spatial map, grid or other spatial representation.

Machine learning and human input enables the automatic generation of the composite indicators that are most useful for making predictions. These composite indicators are complex mathematical functions of the original input data and are relied upon for optimal location decision-making. Appropriate dimensionality reduction techniques are also described to reduce the time and computing resources required for analyzing large amounts of data. The composite indicators can also be pre-selected.

Given a set of heterogeneous data sources and a link to locations on a space of at least two dimensions, the idea of "OLAP on a map" or spatial OLAP (SOLAP) is to create an online analytical processing engine that precomputes aggregates of subsets of data that are relevant for a specific target location on the map.

These precomputations can be done using algorithms that take the spatial coordinate of the target into account.

Various map locations, in accordance with the present invention, have heterogeneous data associated with them, such as text in the form of reviews, purchase data, visitor frequency counts, demographic data for the visitors, locations of competitors, revenue, and traffic information. Preferably, these data are given as a function of time.

The SOLAP function would allow a user to examine the sales at a particular location along with traffic, reviews, and other available information. The spatial data elements would be isolated through the use of a radius of interest automatically. Thus, for example, only data from consumers within the radius of interest would be included in the computation. Traffic information could be also reduced through the use of the radius of interest. The output of the SOLAP algorithm (a SOLAP view) would be for example, the revenue by quarter for the last year for all people within a 1 mile radius of the location of interest.

The amount of data needed to be processed by this algorithm will increase significantly with the number of individuals in the region of interest and the number of variables used in the computation. Thus, preferably, the precomputation of the SOLAP views will be performed to support the vast quantities of data as well as the large number of potential concurrent users for the system.

The system includes a processing unit with a precomputation engine to perform, in accordance with one aspect of the invention, aggregations for at least 95% of all permutations of the variables for a given snapshot of data. Using 20 variables, for example, would require a number or precomputations that could exceed 1 million, or more. These precomputation would need to be available and updated with each new snapshot of data. The precomputations could be easily parallelized on a large multiprocessor machine to reduce the number of serial computations. It can be appreciated that the precomputation scheme here, while optimal for certain data sets and computing environments, may be varied in accordance with the needs of a user. For example, precomputation schemes computing much less than 95% of all permutations can be used in accordance with the present invention.

A method of the present invention includes providing a spatial map, analyzing heterogeneous data having a spatial component to find utilizable data, automatically extracting relationships from the utilizable data and using the extracted relationships to make a prediction about at least one business location on the spatial map.

The prediction is displayed in the form of a rank-ordered list on the spatial map, on a heat map, or on a spatial map including a heat map. The heat-map includes polygons of various colors on the spatial map to indicate optimal regions for business location. The spatial map includes a grid to effectuate identification of locations, regions and the display of predictions.

The step of automatically extracting relationships includes generating a composite indicator. The composite indicator correlates unstructured data with semi-structured data, structured data or any combination of thereof. The composite indicator may specifically correlate spatial data with other data of any format. The composite indicators most relevant to a desired prediction. The composite indicators may be learned from the data. A typical composite indicator would relate demographic variables, competitor proximity, accessibility, product mix, or comparable customer spending patterns with spatial data. The predictions can be shown on a map using a variety of smoothing methods, including Parzen windows, kernel smoothers, averaging, and other more complex methods.

The step of analyzing includes creating a data matrix having a dimensionality and the method further comprises the step of reducing the dimensionality of the data matrix to ease mathematical complexity. In one embodiment, the dimensionality is reduced by assigning relevancy scores to the data, selecting meaningful data based on the relevancy score and utilizing only the meaningful data.

While the present invention is directed for making predictions about any business location, including for predicting optimal retail locations. Also, the term "business" should be broadly construed to include churches, hospitals, real estate investments, restaurants, schools, entertainment, fitness and sports facilitates, and other for-profit and non-profit business. Additionally, the field of data mining is able to provide numerous solutions to analyzing data, so the techniques described herein should be construed to include a variety of ways to analyze the data and to utilize machine learning. The invention is particularly useful for real-estate investors to determine future values of possible investment properties.

BRIEF DESCRIPTION OF THE DRAWINGS

The invention may be better understood with reference to the detailed description in conjunction with the following figures where like numerals denote like elements, and in which:

FIG. 6 is a table for storing data.

FIG. 10 is a detailed version of exemplary matrix of FIG. 9.

DETAILED DESCRIPTION

Figure 1:
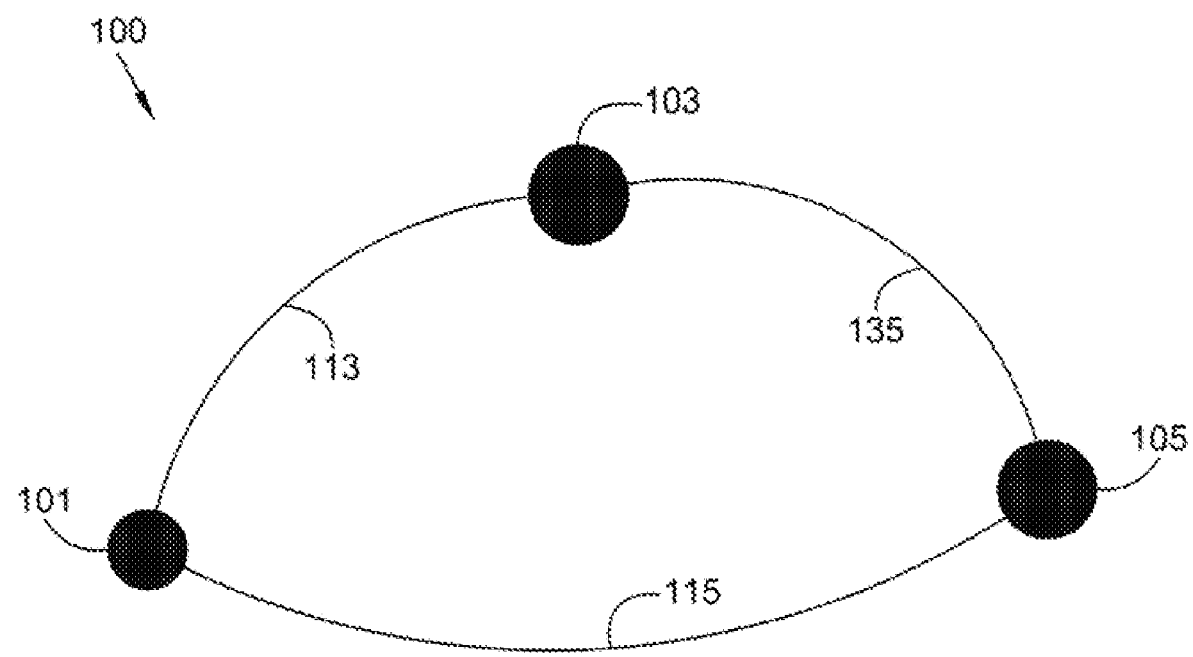
FIG. 1 is a mesh a for gathering data.

On Line Analytical Processing (OLAP) is an approach for providing answers to analytical queries that are multidimensional in nature. The OLAP is part of the broader category business intelligence, which also includes Extract Transform Load (ETL), relational reporting and data mining. The OLAP is used by the present invention to enable analysis of traffic patterns, at various times, to facilitate business location selection.

Databases configured for OLAP employ a multidimensional data model, or a MultiDimensional DataBase (MDDB), allowing for complex analytical and ad-hoc queries with a rapid execution time. An alternative and more descriptive term to describe the concept of OLAP may be Fast Analysis of Shared Multidimensional Information (FASMI). These borrow aspects of navigational databases and hierarchical databases that are speedier than their relational kin.

The output of an OLAP query may be displayed in a matrix format. The dimensions form the row and column of the matrix.

In the core of any OLAP system is a concept of an OLAP cube (also called a multidimensional cube or a hypercube). It consists of numeric facts called measures which are categorized by dimensions. The cube metadata is typically created from a star schema or snowflake schema of tables in a relational database. Measures are derived from the records in the fact table and dimensions are derived from the dimension tables. In MOLAP (Multidimensional OLAP) products the cube is populated by copying snapshot of the data from the data source, ROLAP (Relational OLAP) products work directly against the data source without copying data and HOLAP (Hybrid OLAP) products combine the previous two approaches. Examples of the hypercube are described later in the discussion in more detail in following description.

The OLAP cubes can produce an answer to a query in a fraction of the time for the same query using a relational database. One of the important mechanisms in OLAP that may be used for achieving such performance is the use of aggregations. Aggregations are built from the fact table by changing the granularity on specific dimensions and aggregating up data along these dimensions. The number of possible aggregations is determined by every possible combination of dimension granularities.

The combination of possible aggregations and the base data contain the answers to every query that may be desired from the data. In one possibility, instead of calculating all the aggregations, only a predetermined number of aggregations are fully/partially calculated while the remaining are solved on demand. This approach may reduce the computation requirements. The problem of deciding which aggregations (a.k.a. views) to calculate is known as the view selection problem. View selection can be constrained by the total size of the selected set of aggregations, the time to update them from changes in the base data, or both. The objective of view selection is typically to minimize the average time to answer OLAP queries. Other approaches, such as, greedy algorithms, randomized search, genetic algorithms and A* search algorithms may also be used for this purpose.

The OLAP systems may be categorized using the following taxonomy, each being defined as a variant included under the definition of OLAP for the purposes of this specification.

Multidimensional Online Analytical Processing (MOLAP) is a form of OLAP. MOLAP may use database structures that are generally optimal for attributes such as time period, location, product or account code. The way that each dimension will be aggregated is defined in advance by one or more hierarchies. MOLAP may be an alternative for the relational database technology including Relational Online Analytical Processing (ROLAP). While both the ROLAP and the MOLAP analytic tools are designed to allow analysis of data through the use of a multidimensional data model, MOLAP differs significantly, in that it requires, the pre-computation and storage of information in the cube—the operation known as processing. The MOLAP stores this data in an optimized multi-dimensional array storage, rather than in a relational database (i.e. as in ROLAP).

ROLAP may also work directly with relational databases. The base data and the dimension tables are stored as relational tables and new tables are created to hold the aggregated information. The present system is contemplated to employ ROLAP in circumstances where dimensionality of the given problem is not prohibitive.

Another aspect the present invention provides a computing technique for summarizing, consolidating, viewing, applying formulae to, and synthesizing data in multiple dimensions. This technique may be referred as Spatial Online Analytical Processing (SOLAP). SOLAP is extended to data that does not aggregate into the form of a MDDB. For instance, SOLAP can be used to apply these computer techniques efficiently to spatial data or any other form of data discretely separable. SOLAP includes spatial or location intelligence. Location intelligence is the capacity to organize and understand complex phenomena through the use of geographic relationships inherent in all information. Applied in a business context, the outcomes are meaningful, actionable and can provide a sustainable competitive advantage, particularly when combined with competitive intelligence. Implementation/s in more detail in respect of handling of data using SOLAP in what follows later in the description.

Hybrid methods may employ various OLAP schemes and include ROLAP, MOLAP and SOLAP techniques. The optimal scheme depends on the data being analyzed.

According to one possibility data may be gathered from a mesh 100 shown in FIG. 1. The mesh 100 represents a spatial map. The mesh 100 includes nodes 101, 103 and 105. Each of the nodes 101, 103 and 105 represents a location. The location may be any geographical location of interest. The location may be a square on a road, or a market place, or a colony, or a residential area, or hospital, or an educational institute, a shop in a shopping mall, or the mall itself, or any other business place, or any combination thereof.

The arc 113 connects the nodes 101 and 103. An arc 135 connects the node 103 and 105. An arc 115 connects the nodes 101 and 105. An arc represents a path connecting at least two nodes. The arc may be a path over which a person or entity (vehicle etc.) may travel and reach from a node to another node. A set of data may be obtained using this mesh 100. According to one example, the node 101 may be a residential area, the node 103 may be an educational institute and the node 105 may be a business place. The data may be collected according to the traffic flowing over the arcs 115, 135 and 113. At different point of time a different pattern of traffic flow may be observed over the arcs 115, 135 and 113. For example, during first half of the morning a large traffic flow over arch 115 from residential area (node 101) to the business place (node 105), while second half of the morning a large traffic may flow from the residential area (node 101) to the educational institute (node 103) over the arc 113.

According to the traffic pattern a data may be collected and put in a tabular or in a graphical form. The data may further include supplementary attributes such as average age of the person traveling on a given arc or time during which the traffic pattern was observed, type of vehicles, gender of the person traveling on a give arc etc.

According to one possibility, the data with reference to only one node may be gathered. The data may include details of traffic flow towards the node or traffic flow away from the node. The data may include other attributes, such as, time or duration of time when the data was collected or any other relevant attributes that may be desirable for the purpose of instant invention.

Figure 2:
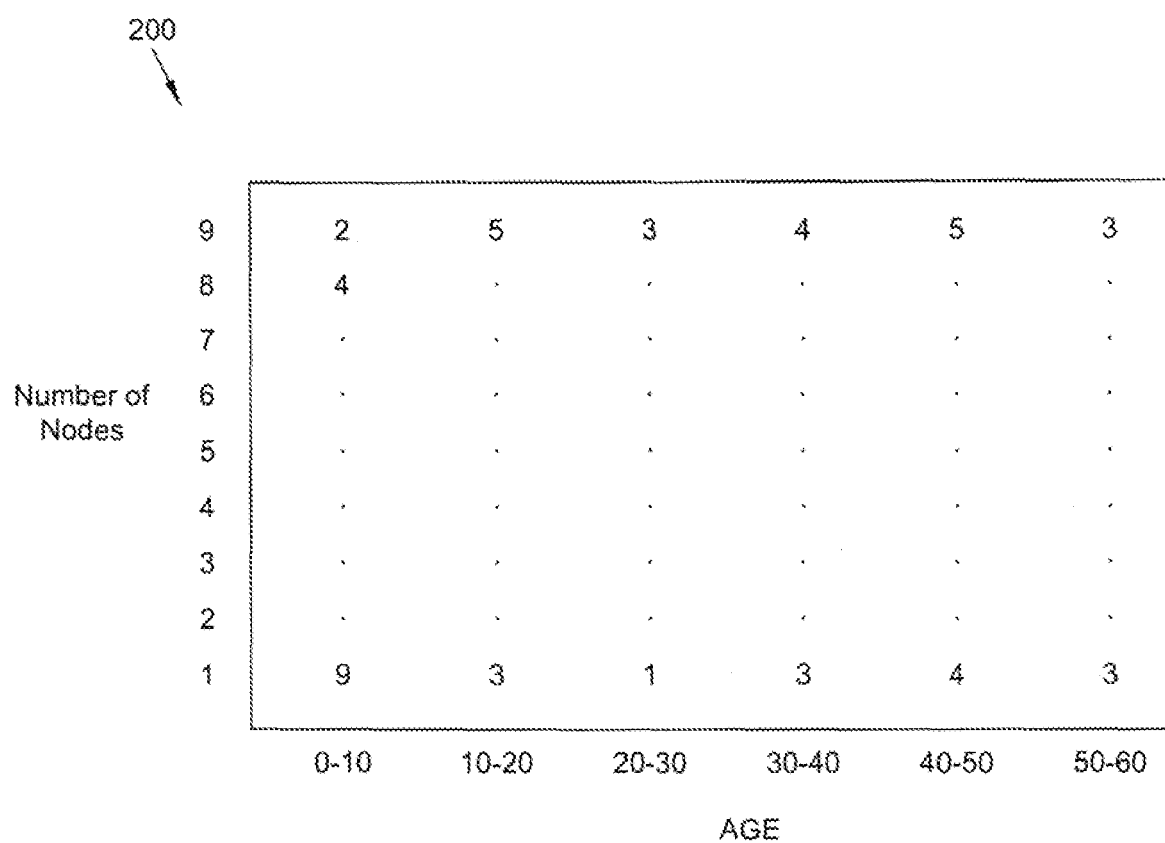
FIG. 2 is a two dimensional data table.

FIG. 2 shows a table 200 having aggregated data of a data cube for an OLAP session. The table 200 displays data representing the number of visited nodes versus age. The tables' values represent the numbers times a node was visited by one or more members of a particular age group. It can be appreciated that data representative of a multitude of phenomena can be stored in this manner so the example given herein is not a limiting expression.

Figure 3:
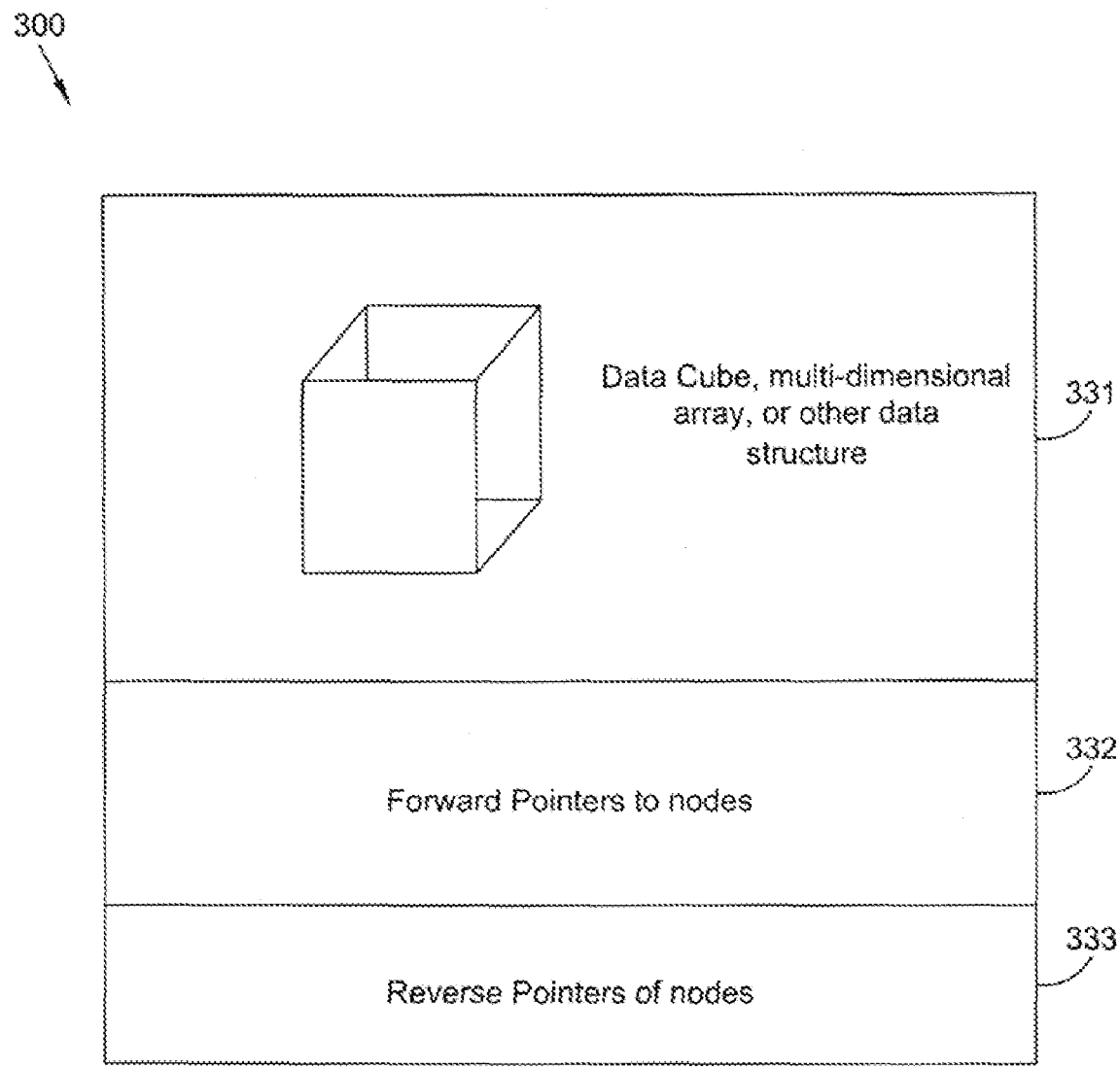
FIG. 3 is a data structure.

FIG. 3 shows an exemplary data structure 300. The first element 331 of the data structure is a multidimensional array containing the number of transitions through a node organized by the attribute data. The axes' description of the multidimensional array may correspond to the attribute data types, such as, age, traveled arc, vehicle type, time and alike. The second element 332 of the data structure may be an array of pointer signifying related nodes that were visited by a person immediately after the person visited the current node. Similarly the third element 333 of the data structure may be an array of pointer signifying related nodes that were visited by a person immediately before the person visited the current node. Knowing the sequence of locations visited by a particular person can help predict future travel patterns for groups of people of people having corresponding habits.

Figure 4:
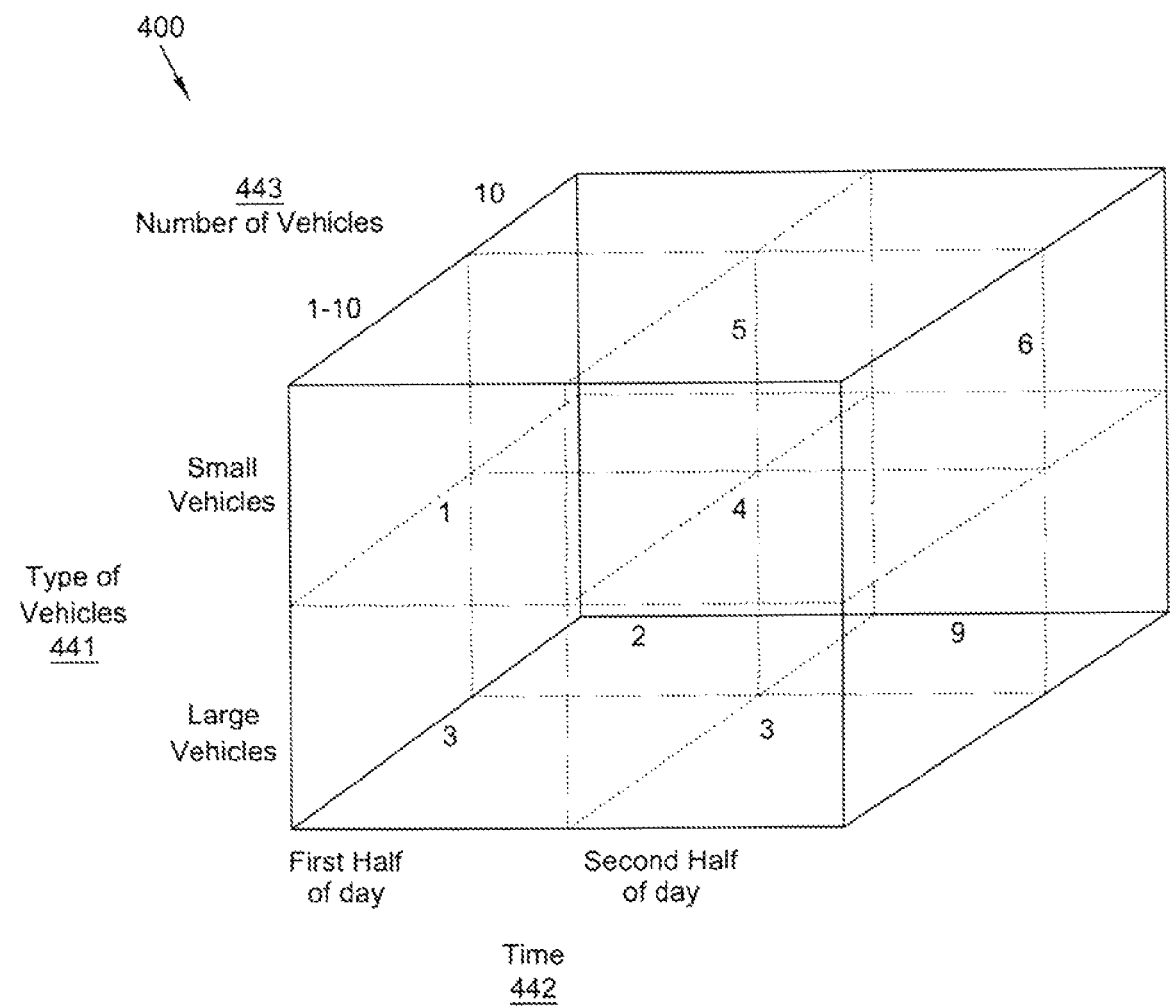
FIG. 4 is a data structure of aggregated data of a 3-dimensional data array representing the traffic through a single node.

FIG. 4 shows an exemplary data structure 400 of aggregated data of a 3-dimensional data array representing the traffic through a single node e.g. a geographical location. The node can represent a business location, intersection, or other location.

The data structure 400 contains three attribute indices: Type of Vehicle 441, Time of data collection 442, and Number of Vehicles 443. The values within the array indicate the number vehicles passed through the particular node with the corresponding attributes. For instance, the array entry "1" denotes that one vehicle passed through particular node with the attributes of the vehicle being large vehicle type and time being first half of the day.

Figure 5:
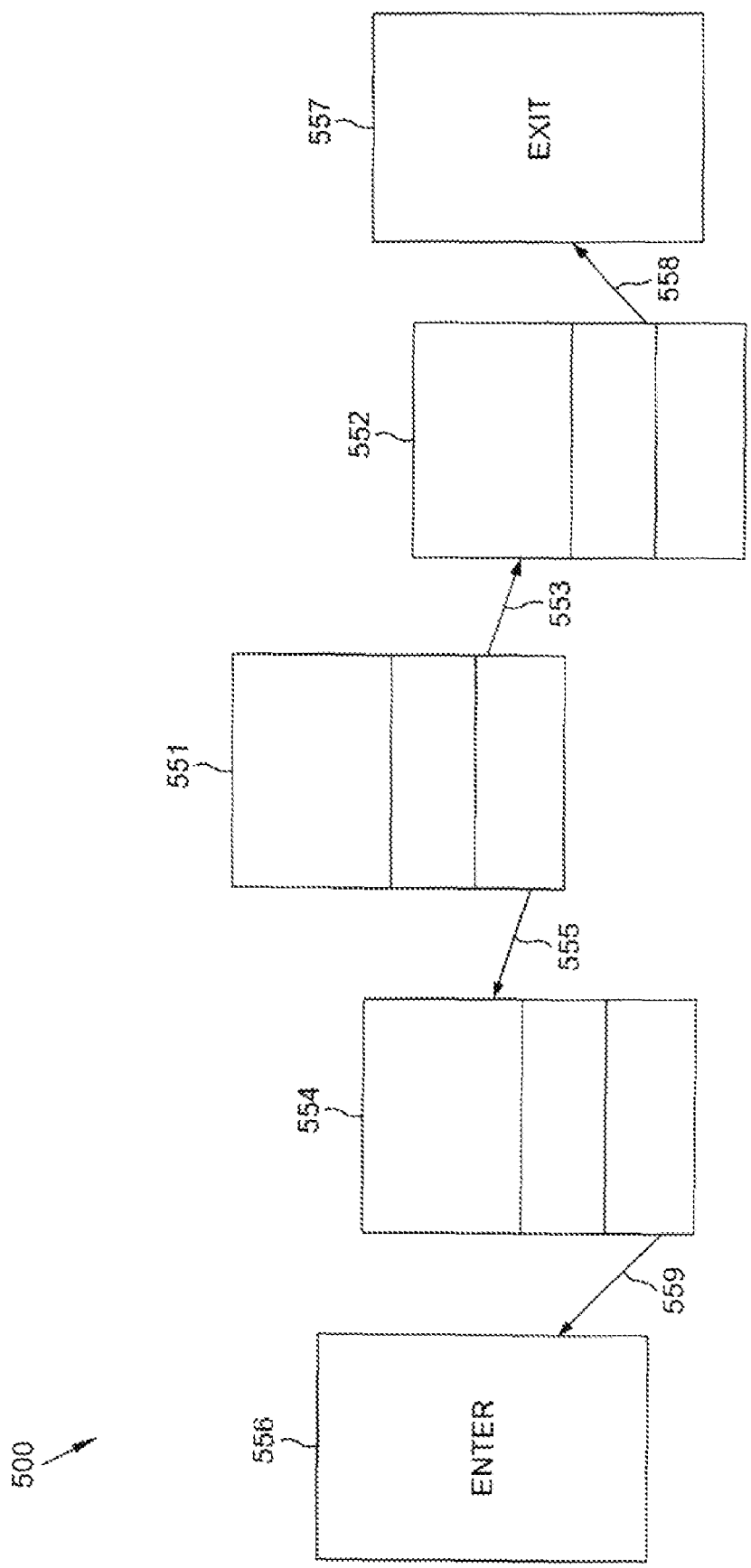
FIG. 5 is a mesh representing the connectivity of a node.

FIG. 5 shows an exemplary mesh 500 of a graph of associated OLAP data structures representing the connectivity of a node. The structure is a directed graph and referred to as a "OLAP-graph". The OLAP-graph may be a Spatial On-Line Analytical Processing (SOLAP)-graph, or a Multi-dimensional On-Line Analytical Processing MOLAP graph, or a Hybrid On-Line Analytical Processing (HOLAP)-graph or any graph that might have been generated by any combination of these or other types of OLAP.

Element 551 is a node of the graph. Nodes 552, 554, 556 and 557 are coupled to the node 551 via arcs 553, 555, 558 and 559. The nodes 551, 552, 554, 556 and 557 respectively include tables or hypercubes, for example. The accessibility of the nodes may be demonstrated by the directed arc 553, 555, 558 and 559.

The arc 553 connects node 551 and node 552. The arc 553 emanates from the forward pointer storage portion of data structure 551 and points to data structure 552. Therefore, the node 552 is also a subsequent node to the node 551. The node 551, may be accessed through the node 554. The dependency is demonstrated by directed arc 555. The arch 555 emanates from the backward pointer storage portion of data structure 551 and points to data structure 554. Therefore, the node 554 is also a previous node to the node 551. There are also demonstrated dummy nodes for entrance 556 and exit 557 from the mesh 500. These dummy nodes represent the nodes for entering and leaving the mesh 500, it may be notices by a person skilled in the art that the two nodes, "enter" and "exit", may note have to be real nodes or may be any node from where traffic may enter or exit into or from the mesh 500. It will be noted that FIG. 5 is a simplified example to describe the structure of an OLAP-graph.

FIG. 6 shows a table 600 for storing data for each node of a mesh. The structure in FIG. 6 is centered around node 01, (661). Thus, in the column corresponding to "Step 0" 662, the only non-zero entry is the entry 663 in the row corresponding to the node 01. The entry 663 is "[100,100]" which represents that the transitions through the node 01 included 100 transitions by women and 100 transitions by men. The data corresponding to the steps other than "Step 0" represents accessing of other nodes by women and men,—respectively. For instance, the entry corresponding to the node 00 and "Step +2" 664, may show that zero transitions through the node 00 two nodes after crossing the node 01 were performed by women. On the other hand, entry 664 may demonstrate that twenty transitions through the node 00 were performed by men two steps after accessing the node 00. Thus, each entry in the table may be a multi-dimensional array whose entries represent the number of transitions by people in each category who transitioned through the corresponding node a given number of steps before or after the node 00. The employed data structure may contain one or more such matrix for each node.

Figure 7:
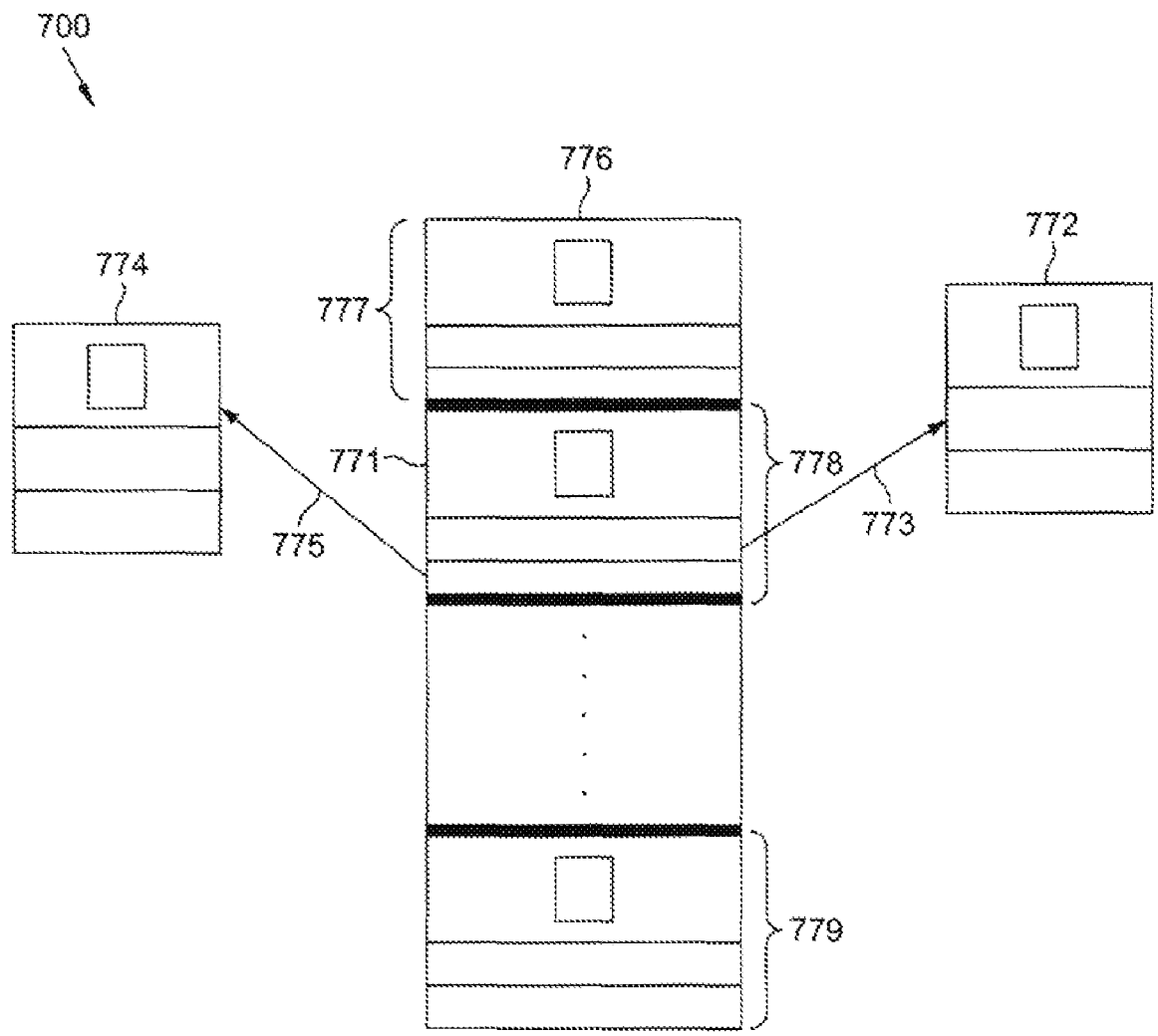
FIG. 7 is a model of an array of OLAP-graphs of OLAP data for a mesh.

FIG. 7 shows an exemplary model 700 of an array of OLAP-graphs of OLAP data for a mesh. The OLAP-graph may be a SOLAP-graph, or a MOLAP graph, or a HOLAP-graph or any graph that might have been generated by any combination of these or other types of OLAP. The base of the data structure is the array 776.

The array 776 has members 777, 778, and 779. Each member of the array 776 is a node of a graph of nodes. A node on the mesh (at the desired level of description) is a member of the array 776. In this manner, all nodes contained in the mesh may have their spatial data accessed by selecting the appropriate array element corresponding to the selected node. The nodes of the data structure are connected to all forward- and reverse-adjacent nodes through the use of pointers. For example, the node 771 is forward-adjacent to node 774 and reverse-adjacent to node 772. This is illustrated by arcs representing pointers 773 and 775 pointing from the base node 771 to nodes 772 and 774 respectively. Directed arc 773 is stored in the forward pointer storage location of data structure 771, while directed arc 775 is stored in the reverse pointer storage location of data structure 771.

Figure 8:
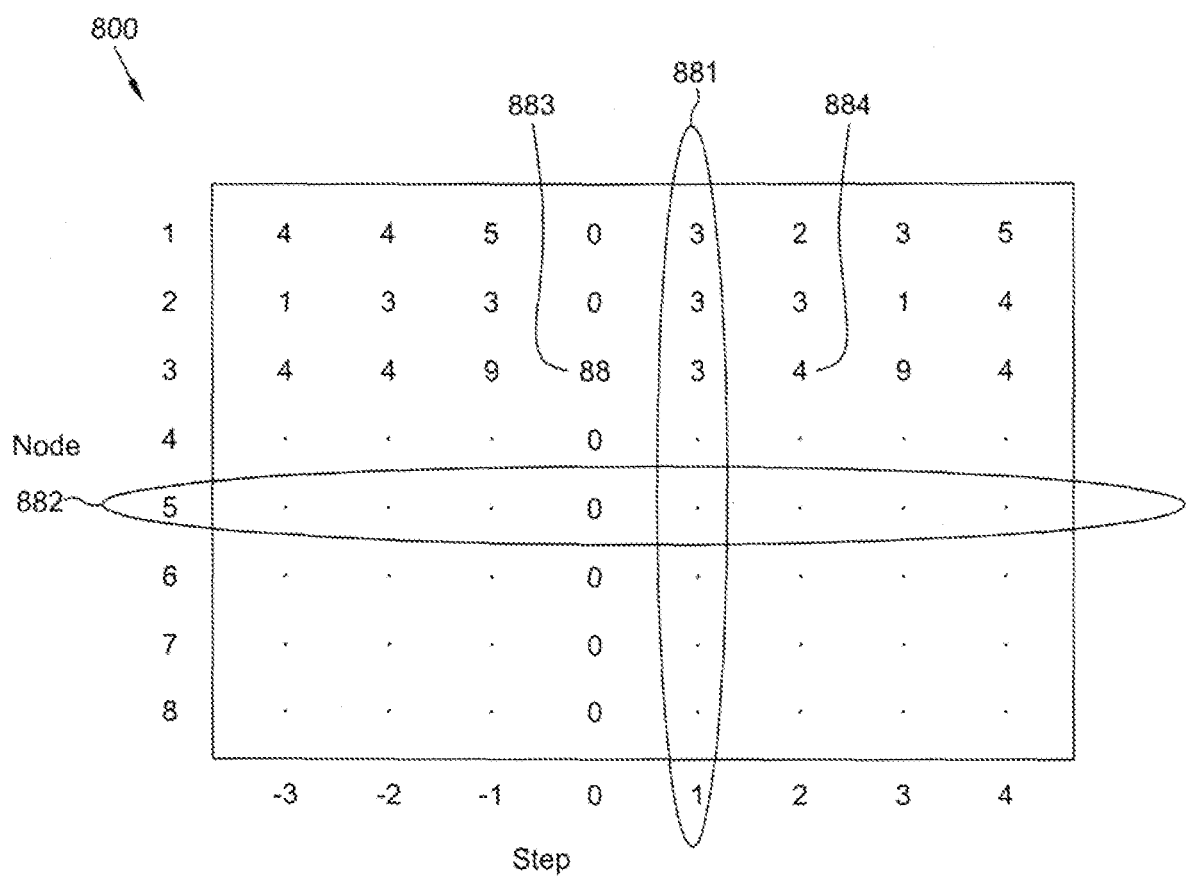
FIG. 8 is a matrix data structure (OLAP-matrix) used to record the number of transitions from a particular node to other node in a mesh.

FIG. 8 shows a table with an OLAP matrix data structure (OLAP-matrix) 800 used to record the number of transitions from a particular node to other node in a mesh. The OLAP-matrix may be a SOLAP-matrix, or a MOLAP-matrix, or a ROLAP-matrix or any matrix that might have been generated by any combination of these or other types of OLAP. This data structure is an alternative embodiment to the previously described OLAP-graph structure capable of storing the number of traversals passing through each node at various steps. A unique matrix may then represent each node in a mesh. The matrix 800 has vertical columns and horizontal rows. The vertical columns, such as 881, refer to steps while the horizontal rows, such as 882, represent node. The entries of the matrix denote how many times the node corresponding to the horizontal row was accessed (or traveled through) a number of steps denoted by the vertical column from a node that may be referred to as a focal node. For instance the "4" corresponding to entry 884 signifies that node "3" was accessed in two steps after the focal-node was accessed. Entry 883 of the matrix is the only member of column 0 to contain a non-zero entry because, by definition, all accesses to the node that is the focal-node must pass through the focal-node at step zero. Otherwise, there would be more than one node that would be portrayed as the focal-node. Therefore, only the focal node may possess a non-zero entry in the column corresponding to step 0. Such a matrix representation may be constructed for each possible focal-node or for the steps transitioning through a set of focal-nodes. For example, a matrix may be constructed to represent all transitioning through four specific nodes in a specified order at specified steps. These four specific nodes however need not be aligned or directly connected to one another.

Figure 9:
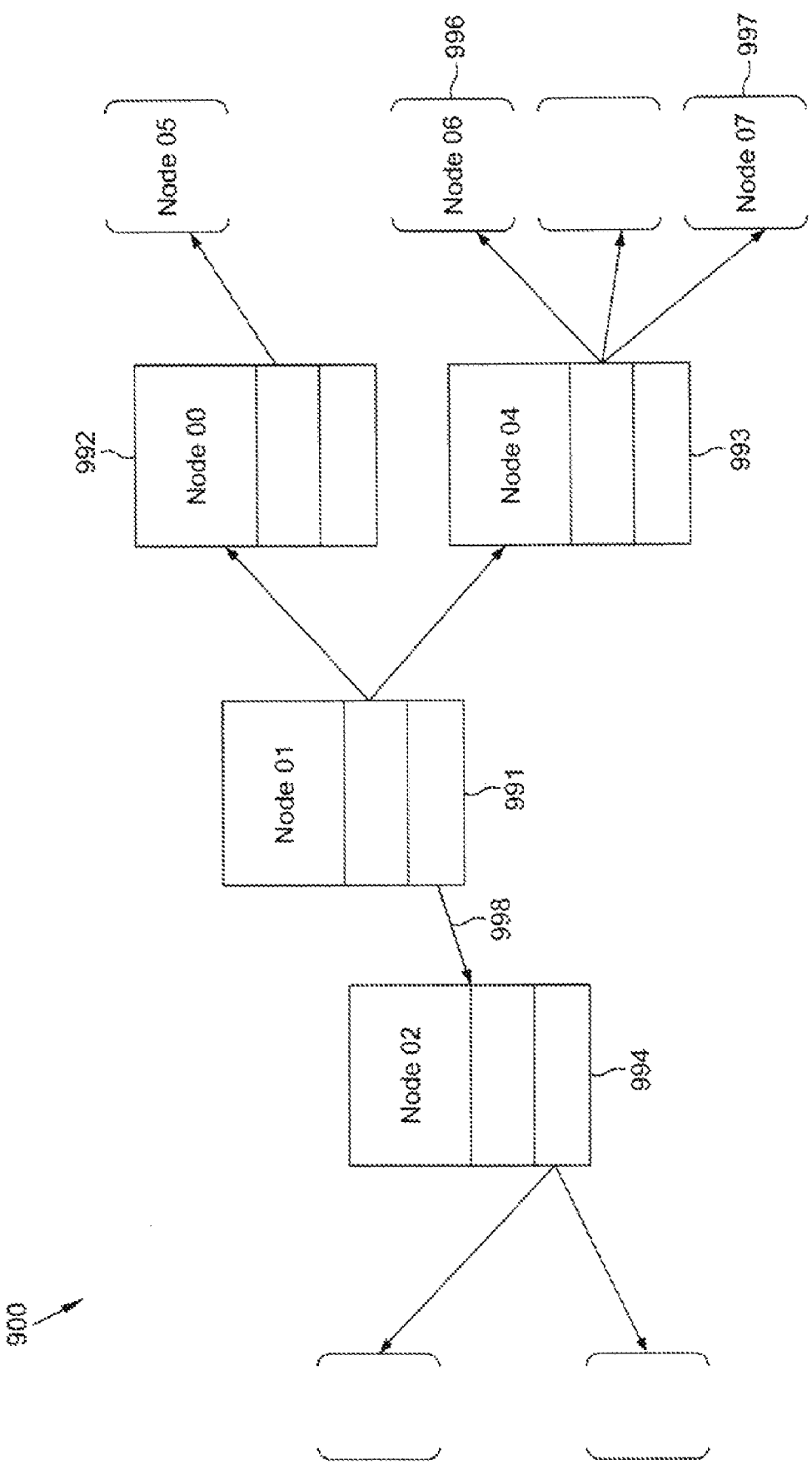
FIG. 9 is a model of an embodiment of the hybrid structure of the OLAP-matrices and OLAP-graph.

FIG. 9 shows an exemplary model of an alternative embodiment of the hybrid structure of the OLAP-matrices and OLAP-graph used to record the number of transitions from a particular node to other nodes. The hybrid OLAP-graph as shown contains two levels of the OLAP-graph data structure 900. The OLAP-graph data structure is centered on the node 01 (data structure 991). The illustration that the node 01 (data structure 991) then connects to the node 00 (data structure 992) and the node 04 (data structure 993) demonstrates that the corresponding nodes have been accessed one step after the node 01 (data structure 991) was accessed. The node 01 (data structure 991) also is connected to the node 02 (data structure 994), but its orientation demonstrates that the node 02 was accessed one step before the node 01 (data structure 991). The orientation of the node 02 (data structure 994) is demonstrated by viewing directed arc 998 between data structures of the node 01 (data structure 991) and the node 02 (data structure 994). Directed arc 998 emanates from the reverse-template portion of data structure 991 and is directed to data structure 994. In this example, the node 01 (data structure 991), is the first level node in the OLAP-graph 900. The nodes 05-07 (data structures 995-997), represented as matrices, are the second level of the OLAP-graph 900. These matrices may then be used to terminate the OLAP-graphs, as shown in FIG. 9. For instance in FIG. 9, matrix 995 is the matrix of steps, centered with the node 05, that go through node 00 (data structure 992) at step −1, node 01 (data structure 991) at step −2, and the node 02 (data structure 994) at step −3.

Matrix 1000 of FIG. 10 is a detailed version of exemplary matrix 995 of FIG. 9 and contains non-zero entries in step columns −1, −2, and −3 in the rows corresponding to the nodes 00-02. The described hybrid OLAP-graph, and associated representation may be implemented with any number of levels of the OLAP-graph data structures such that the OLAP-graph structure is terminated by OLAP-matrices. This embodiment may provide the advantage of a diminished memory requirement to store the OLAP data several steps away from the original node than for a complete OLAP-graph. Further, it allows for an early termination of the amount of data stored within any hybrid OLAP-graph to a determinable, finite number of steps. Determined termination of the OLAP-graph is achieved by using the OLAP-matrices to prevent further growth of the OLAP-graph. The hybrid OLAP-graph is merely a OLAP-graph terminated by OLAP-matrices. This difference allows the hybrid OLAP-graph to generally possess a smaller number of levels than a corresponding OLAP-graph. The OLAP-matrices then hold the information regarding the levels of the OLAP-graph truncated in the hybrid-OLAP graph in an array format. It will be noted by those of skill in the art that these alternative methods of storing transaction data have the further advantage of aggregation of the transaction data. Raw transaction data requires storage space on the order of the number of separate transactions stored in the data set. However, the various methods of creating data structures to represent transaction data may require less storage space than saving a corresponding list of transaction data. The amount of storage space required as a result of these database constructions may depend on the number of distinct transaction types, the total number of data attributes, and the total number of steps in the time horizon.

Figure 11:
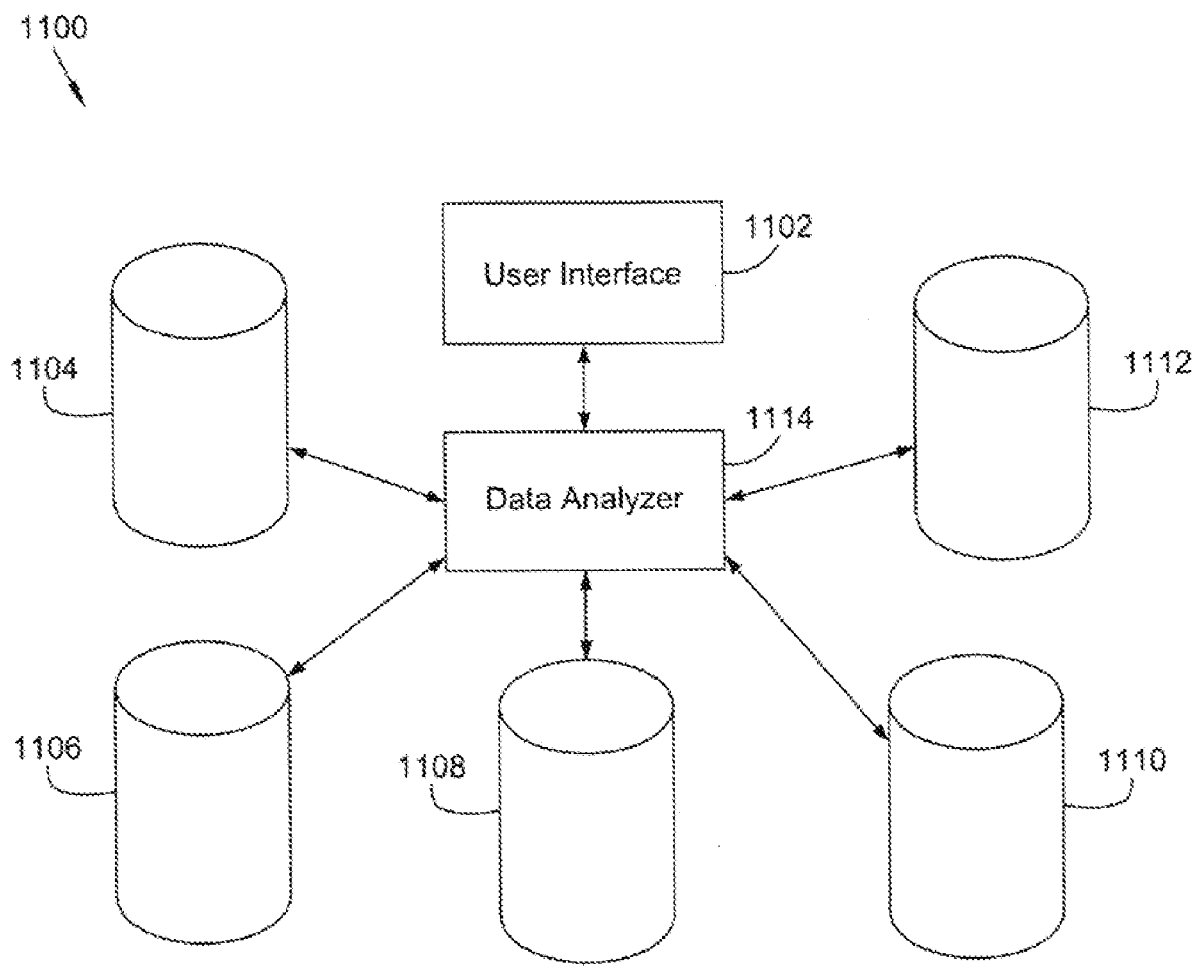
FIG. 11 is a system in accordance with the present invention.

FIG. 11 is a system 1100 for optimizing business location selection. The system includes a user interface 1102, heterogeneous databases 1104, 1106, 1108, 1110, and 1112 and a data analyzer 1114. The databases hold structured data, unstructured data, semi-structured data and spatial data. The heterogeneous databases 1104, 1106, 1108, 1110, and 1112 are in communication with the data analyzer 1114. The heterogeneous databases 1104, 1106, 1108, 1110, and 1112 have data that has at least a spatial component. The data analyzer 1114 may have an interface for displaying a spatial map. The spatial map includes a heat-map and the interface displays the prediction on the heat-map to predict optimal regions for a business location. The heat-map may include polygons of various colors. According to one possibility, the data analyzer 1114 creates a data matrix having a particular dimensionality and reduces the dimensionality of the data matrix. The data analyzer 1114 creates a data matrix having a particular dimensionality and reduces the dimensionality of the data matrix by assigning relevancy scores to the data, selecting meaningful data based on the relevancy score and utilizing only the meaningful data. The data structures may be a SOLAP-graph data structure or an MOLAP-graph data structure or ROLAP-graph data structure or a data structure that is formed by any combination thereof.

The data analyzer 1114 includes a computer with programmed with software, which enables communication with the databases 1104, 1106, 1108, 1110, and 1112 to analyze data integrity and data quality. The databases 1104, 1106, 1108, 1110, and 1112, and the data contained therein are analyzed to find utilizable data. The analyzer 1114, which includes a computer programmed with software, extracts relationships from the utilizable data. The analyzer 1114 while extracting relationships from the utilizable data may employ adaptive machine learning.

According to one aspect of the invention the system 1100 includes a networked computing environment, which communicates with the various database 1104, 1106, 1108, 1110, and 1112, and other databases and computing resources. The network may include a local network, a virtual private network, or a public network such as the Internet. In this way, the data analyzer 1114 communicates with remote databases and remote computing resources to optimize analysis and processing of data.

The data analyzer 1114 analyzes heterogeneous data from the databases 1104, 1106, 1108, 1110, and 1112, and other databases, to make a prediction about at least one business location from the extracted relationships using a spatial map. It can be appreciated that the data may have homogenous components that are also be analyzed to extract relationship from the utilizable data. The analyzed data may be stored in an OLPA graph data structure. The methods of the present invention can be encoded in software or hardware used by the data analyzer 1114.

The system 1100 of the present invention automatically identifies and combines heterogeneous data sources to provide a rank-order list of possible locations in a spatial region. The interface may be used for displaying the prediction in the form of the rank-ordered list. The data analyzer 1114 generates and utilizes one or more composite indicators, which are complex mathematical functions of the original input data. The composite indicators are generated for extracting the relationship. The composite indicators may be a function of input data having any of a number of heterogeneous forms. The composite indicator may correlate spatial data with unstructured data and/or structured data. The composite indicator may correlate spatial data with an indicator derived from the group consisting essentially of: demographic variables, competitor proximity, accessibility, product mix, and comparable customer spending patterns or any other variables. The data analyzer 1114 may extract relationship using correlation analysis.

In an alternate embodiment, some of the composite indicators are pre-determined. People or machines may facilitate the pre-determination of a composite indicator. The system 1100 employs appropriate dimensionality reduction techniques that are also an aspect of the invention to reduce mathematical burden. The data analyzer 1114 is configurable to utilize various approaches to analyzing data, including those outlined below.

Data Preparation

The databases 1104, 1106, 1108 and 1110 include original data sets that can be described in terms of four main types of data. The data types are heterogeneous and include structured data (in the form of tables), unstructured data (in the form of free-text narratives), semi-structured data, and also spatial data.

The data analyzer 1114 analyzes each data type separately. It can be appreciated that the data may also be analyzed in combination with some other data set. According to one aspect of the invention the data analyzer 1114 creates and utilizes composite indicators to summarize and transform the original data sets. The data analyzer 1114 also filters and cleanses the original data sets in order to have the best output. The cleansing process employed by the data analyzer 1114 includes removing outliers, identifying bad data that is not within normal bounds, and transforming selected bad data to within normal bounds.

Structured Data

The data analyzer 1114 converts structured data into a flat table with rows and columns. Each row corresponds to an observation and each column corresponds to a measured variable. The observations preferably are independent and identically sampled observations from the population, but it can be appreciated that non-independent and non-identically sampled observations can also be converted into useful form.

The data analyzer 1114 is configurable to convert observations relating to the demographics of customers in a region of interest (R) into rows on a flat table. The region of interest (R) is a set of connected polygons, but unconnected polygons can represent a region of interest on a map. Customer oriented structured data (say, C) relevant to R is assumed to contain demographic and summarized purchase data of reasonable resolution. Location oriented structured data is assumed to be arranged where each observation corresponds to a location with the columns corresponding to the attributes of the location. These features can be assigned to a matrix L. Thus, fully structured data from of these types for the region R correspond to two rectangular matrices C and L.

The data analyzer 1114 is also configurable to convert observations relating to the traffic information and other attributes relevant to the locations stored in L so that these can be concatenated with the matrix L. Assuming, that the customer matrix is of size ($N_c \times p_c$) and the location matrix is of size ($N_L \times p_L$), where N corresponds to the number of customers (or locations) and p corresponds to the number of attributes for the customers (or locations). Note that the matrix corresponding to customers can correspond to existing customers, dormant customers, prospective customers, or an arbitrary population relevant to R.

Semi-Structured Data

The data analyzer 1114 is configurable to convert semi-structured data into a useable flat table. Preferably, the data analyzer 1114 uses XML protocols to handle semi-structured data.

In accordance with one embodiment of the present invention, relevant semi-structured data is coded into a similar flat matrix to C and L above, with the additional restriction that the integrity between semi-structured fields be preserved. Real-estate information, weather, selected traffic elements, and some location attributes are presented in a semi-structured format. The semi-structured location and customer tables are denoted as $S_L$ and $S_C$ respectively with appropriate sizing variables.

Unstructured Data

Unstructured data is available in many forms. News print, Internet textual publications, Internet images, television audio and video streams, satellite broadcasts, and radio broadcasts. In view of the limitations on computing power and network bandwidth, the presently most useful form of unstructured data is in the in the form of free-text narratives such as are available on the Internet, real-estate listings and venues such as Craigslist. These free-text narratives provide a wealth of valuable information. While free-text narratives are clearly recognized as providing a wealth of valuable information, it can be appreciated however, that as computing power and network bandwidth cease to be limitations, that speech and video can be directly utilized, or converted into intermediary form to be indirectly utilized, for the purposes of the present invention.

Given a corpus of $N_d$ documents, each document can be transformed in a vector space representation by creating a matrix of size ($N_d \times p_t$), where $p_t$ equals the number of unique terms in the union of all terms that appear in the $N_d$ documents. An intermediary step may be required for audio and video streams so that the streams are digitized (as necessary), converted into ASCI or other textual representation, and analyzed. The dimensionality of the problem of utilizing free-text narratives is significant and even for relatively short documents, the matrix size may include parameters reflective of $N_d$=30,000 documents, $p_t$=40,000, or greater.

Thus, for customer and location information, assume that two matrices $U_c$ and $U_L$ are created, respectively. These matrices are massive, typically containing $O(10^8)$ elements and can often be handled efficiently with sparse matrix algorithms. The dimensionality of these matrices can be marginally reduced through the process of stemming, stop-word elimination, and elimination of infrequent terms. However, the assignment of a relevancy score to each attribute and a composite score to each table can significantly aid in dimensionality reduction.

Spatial Data

Spatial data is stored in a spatial database and contains the relevant information about business locations in a 2 or 3 dimensional grid. The gridlines are arbitrary and can be at any resolution. A higher resolution grid yields a higher fidelity system. The data analyzer 114 includes a resource to cleanse, filter and prepare the spatial data, as the other data in the system, in order to generate the best possible predictions. The spatial database should accommodate the computation of relationships such as set oriented, topological, directional, metric, dynamic, and shape-based relationships. The statistical basis of the spatial analysis used in this system is on spatial autocorrelation.

Target Variables

Assuming that the relevant business has an existing set of stores or locations, each store can be assigned a figure of merit that indicates its relative value. For example, revenue, profitability, size, the so-called RFM score (recency, frequency, monetary) score can be assigned to each store. Other figures of merit relevant to business location selection can be chosen. Given the stores can be rank ordered using one of these scores or a combination of these scores (such as revenue/square foot). These scores can be formulated into a table Y, with $N_t$ rows and $p_y$ columns, each column corresponding to one of the above figures of merit.

Assigning a Relevancy Score

The data preparation steps described above can yield massive data sets. According to one embodiment of the invention, the matrices have $O(10^6)$ elements and $O(10^5)$ columns, or more. In order to reduce the dimensionality of the problem, several methods can be employed.

For example, suppose that a new matrix is created which an appropriate composition of (C, L, S). There are several key methods to reduce dimensionality.

Singular Value Decomposition (SVD) of the matrix X=U'DV, (where the indicates the transpose operator) reduces dimensionality. In this decomposition, D contains the singular values of the matrix X. We choose the first n components in the orthogonal matrix V and create a projection matrix $P=V_n X$. This creates a low dimensional linear representation of the original matrix X.

Information Gain Formulation: in this formulation IG(y|x)=H(y)−H(y|x), where y is defined as a column in the target matrix Y, and x is a column in the input matrix X. The operator H(q) computes the Shannon entropy of the random variable q: $H(q)=-\int p(x) \log p(x)$, assuming q has density function p. This is an information theoretic quantity often used in the text mining community.

$$\text{Correlation: } corr(y|x) \square \frac{E(xy) \square E(x)E(y)}{\sqrt{E(x^2) \square E^2(x)} \sqrt{E(y^2) \square E^2(y)}}.$$

Once these relevancy scores are measured for each variable in the table X, the columns in X can be rank ordered in terms of relevance. A pre-specified parameter $w_r$ can be chosen so that only those columns in X, which have relevance greater than $w_r$, are retained. This typically reduces the dimensionality of the problem significantly, and can be controlled by the single parameter $w_r$. Given a set of tables $X_1, X_2, \ldots, X_k$, each table can be assigned a total relevancy to the prediction problem by taking a possibly weighted sum of the relevancy scores for each variable.

Other Measures of Relevancy

In the past, human experts have dominated the domain of business location selection. Accordingly, it is likely that a business would have experts that have their own opinions about the relative weighting of the attributes in question. Thus, we give them the ability to choose a set of weights w such that the variables are assigned either a relevancy proportional to w'X or w'IG(y|x), or w'corr(y|x).

Convex Combinations

For reasons of interpretability, in the event that expert weights are used, we restrict the weights to be such that w'l=1, w>0 for all elements of w, where l is the vector containing unity of appropriate length. This results in a convex combination of attributes, and leads to a simple way to interpret the weights as prior probabilities of the importance of each attribute.

Once the appropriate dimensionality reduction process is complete, we are left with a large input matrix X and an associated target vector (or matrix) Y. Our problem now is to learn the relationships between X (of size N×p) and Y (of size N×m) so that in the region of interest R, we can make predictions. Formally, we have a learning problem to estimate a function F such that Y≈F(X, θ), where θ is a set of parameters corresponding to the coefficients and underlying structure of the model.

Modeling Methods Gaussian Process Regression

Several methods exist for learning F which corresponds to the best set of attributes that are predictive of an optimal store, as measured by the components of Y. These include a linear model, logistic regression, linear discriminant analysis, neural networks, decision trees, and Gaussian Process Regression. The latter method is preferable for various mathematical reasons described here. There are numerous references to the former methods, and they all suffer from a serious drawback: while they can make predictions, i.e., for a new input value, say $\tilde{X}$, they can emit $\hat{y}=F(\tilde{X}, \theta)$, they generally do not directly provide an estimate of the certainty in the prediction. Thus, while a value is emitted, the user is not able to determine with what confidence that information is estimated to be correct. GPR, on the other hand, provides both a prediction and a measure of confidence in that prediction. A brief overview of Gaussian Process Regression is given here.

The Gaussian Process Regression (GPR) technique can be interpreted in a Bayesian context as one where a prior distribution is placed over the space of all possible values of F, such that those functions, which are considered more likely, are given higher weight. The function F is written as F(x)~GP(m (x),k(x,x')) with the mean function m(x) generally taken to be zero. The covariance function k(x,x') measures the relationship between two inputs, x and x'. Several covariance (or kernel) functions can be used. For example, we use the squared exponential function $k(x,x')=\exp(\frac{1}{2}|x-x'|^2)$ which emphasizes inputs that are nearby in the input space, and de-emphasizes those that are far away. Once the covariance function is set, predictions can be made using the following governing equations:

$$\hat{y}=k^T(K+\sigma_n^2 I)^{-1}y,$$

$$V(\hat{y})=k(x,x)-k^T(K++\sigma_n^2 I)^{-1}k$$

These governing equations give the point estimate for y and the variance of that estimate in a mathematically principled way.

Other Modeling Methods

Support Vector Machines (SVMs) are related to Gaussian Processes and form a second potential method for predicting optimal store locations. The SVM performs regression by projecting the original data into a high, possibly infinite dimensional feature space. In this feature space, a linear model can be fit to the data, with the resulting fit being projected back into the original data space. Numerous studies have shown that this method works well at both regression and classification problems. The standard formulation for the SVM is as follows:

Minimize $\|w\|^2/2$ subject to $$x_i \cdot w + b \geq +1 \text{ for } y_i = +1$$

$$x_i \cdot w + b \leq -1 \text{ for } y_i = -1$$

where $\{(x_i, y_i) | i \in \{1, 2, \ldots, n\}\}$ is the set of n training examples where the $x_i$'s are the inputs and each $x_i \in R^d$. $y_i \in \{-1, +1\}$ (i.e., the two possible labels), w is the normal of the separating hyperplane, and b is an intercept term.

Slack variables $\xi_i, i \in \{1, 2, \ldots, n\}$ are introduced into the optimization problem as follows:

$$\text{Minimize} \|w\|^2/2 + C \sum_{i=1}^{n} \xi_i \text{ subject to}$$

$$x_i \cdot w + b \geq +1 - \xi_i \text{ for } y_i = +1$$

-continued $$x_i \cdot w + b \leq -1 + \xi_i \text{ for } y_i = -1$$

$$\xi_i \geq 0 \forall i$$

C is a parameter chosen by the user which reflects how large a penalty should be assigned to the errors. The slack variable allows for a soft penalty for each example. The data can be mapped to an infinite dimensional space through the use of a kernel operator (as for the Gaussian Process). In this case, we convert the last optimization problem into its Wolfe dual:

$$\text{Maximize} \sum_{i=1}^{n} \alpha_i - \frac{1}{2} \sum_{i=1}^{n} \sum_{j=1}^{n} \alpha_i \alpha_j y_i y_j x_i \cdot x_j \text{ subject to}$$

$$0 \leq \alpha_i \leq C \forall i \in \{1, 2, \ldots, n\}$$

$$\sum_{i=1}^{n} \alpha_i y_i = 0.$$

The solution to this problem is $$w = \sum_{i:(x_i, y_i) \in N_s} \alpha_i y_i x_i,$$

where $N_s$ is the set of support vectors. For example the Gaussian kernel, $$K(x_i, x_j) = e^{\frac{-\|x_i - x_j\|}{2\sigma^2}}$$

gives rise to an infinite dimensional space. Neural Networks, Decision Trees, and linear models, and naïve Bayes (in the case that the problem can be recast as a classification problem) are other potential method for performing this prediction although they suffer from the problem that they do not generate estimates of the prediction confidence in a principled manner. Because of this and other technical reasons, the GPR method is the preferred choice.

Figure 12:
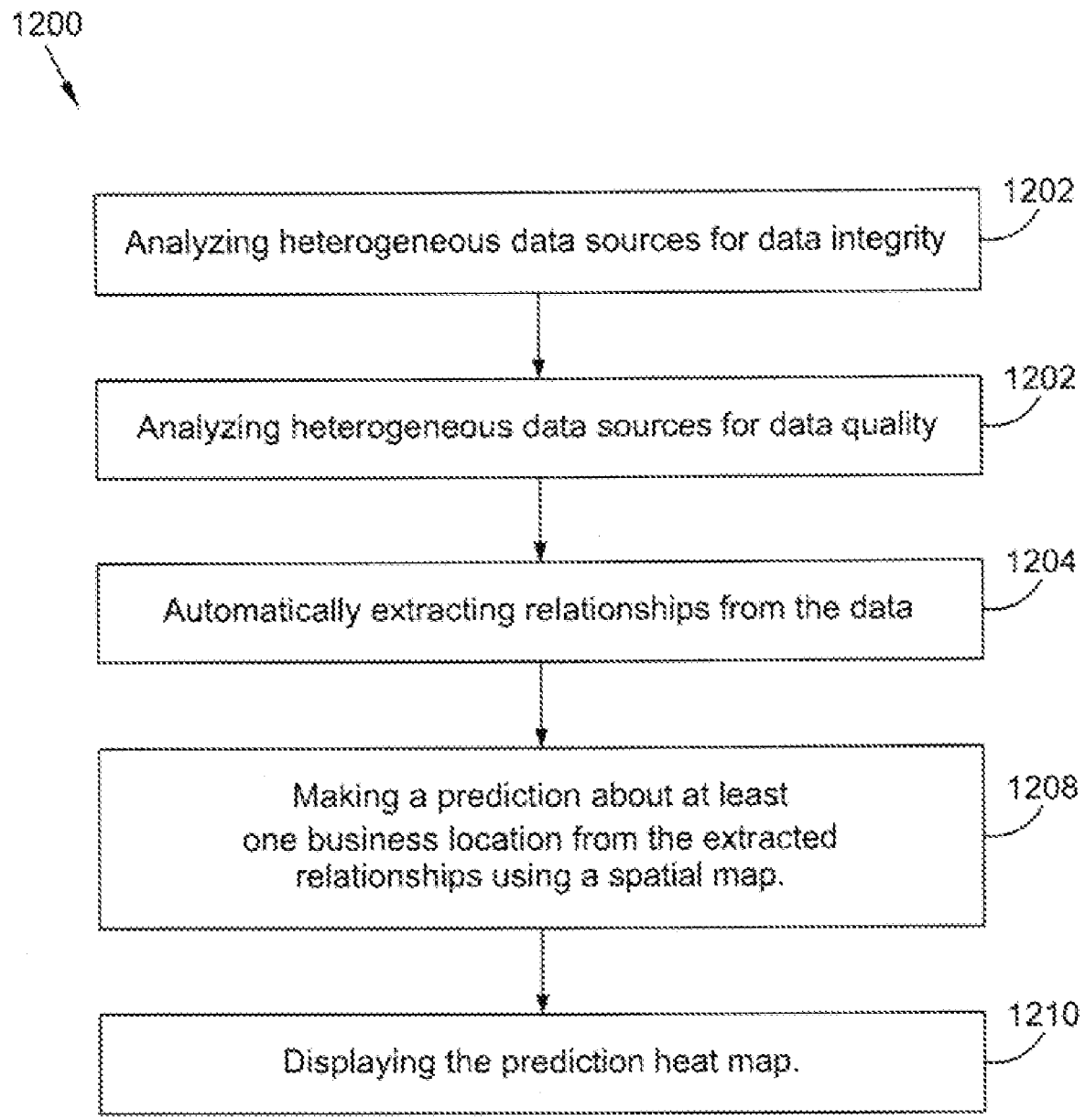
FIG. 12 is a method in accordance with the present invention.

FIG. 12 shows a method 1200 of selecting optimal business locations. The method 1200 includes the step 1202 of analyzing heterogeneous data sources for data integrity, the step 1204 of analyzing heterogeneous data sources for data quality, the step 1206 of automatically extracting relationships from the data, the step 1208 of making a prediction about at least one business location from the extracted relationships using a spatial map, and the step 1210 of displaying the prediction on a heat map. It can be appreciated that although the present invention may output prediction using a spatial map, including a spatial map having a spatial map, or a heat map, the predictions output in accordance with the present invention may be in any human or computer-readable form. For example the predictive output may be tabulated for human viewing, or read directly by a computer for use in broader applications.

According to one possibility, the step 1202 of analyzing may also include a step of receiving a spatial map. At step 1202 the heterogeneous data having a spatial component may be analyzed to find utilizable data and storing the utilizable data in an OLPA graph data structure. The step 1202 of analyzing includes creating a data matrix having a particular dimensionality and the method further comprises the step of reducing the dimensionality of the data matrix. The step 1202 of analyzing includes creating a data matrix having a particular dimensionality and the method further comprises the step of reducing the dimensionality of the data matrix by assigning relevancy scores to the data, selecting meaningful data based on the relevancy score and utilizing only the meaningful data. At step 1204 relationships may be extracted from the utilizable data. At the step 1204 of extracting relationship may include a step for employing adaptive machine learning for extracting relationship. The step 1204 of extracting relationships includes extracting relationships using correlation analysis. At step 1208 the extracted relationships may be used for making a prediction about at least one business location. The step 1208 of extracting includes the step of adaptive machine learning for extracting relationship. The step 1208 of extracting includes generating a composite indicator. The composite indicator correlates spatial data with unstructured data and structured data. The data structure is a SOLAP-graph data structure or an MOLAP-graph data structure or ROLAP-graph data structure or a data structure that is formed by any combination thereof. The composite indicator correlates the spatial data with at least one indicator derived from the group consisting essentially of: demographic variables, competitor proximity, accessibility, product mix, and comparable customer spending patterns. At step 1210 the prediction may be displayed on the spatial map. The step 1210 of presenting may include step of presenting the prediction in the form of a rank-ordered list on the spatial map. The spatial map includes a heat-map. The step 1210 may be presented to display polygons of various colors.

The step 1206 of extracting relationships generates a composite indicator, which includes more than one indicator that is relevant for selecting an optimal business location. The step of automatically extracting relationships, in accordance with one aspect of the invention includes generating a composite indicator, which correlates projected profitability and at least one other indicator. Preferably the at least one other indicator includes one or more of the following: demographic variables, competitor proximity, accessibility, product mix, and comparable customer spending patterns.

Composite indicators may, for example, include revenue per square foot, sales per unit time, and sales per unit time per age bracket of expected customers. Testing the composite indicators against independent data sets may further verify or determine usefulness of the composite indicator. It can be appreciated that any available data may be used in accordance with the present invention and composite indicators may be pre-determined, or learned from the data that is available.

Location accessibility is an indicator that includes parking availability and proximity to well-traveled roads and freeways. However, there are numerous location accessibility indicators available for use, depending on the data.

Demographic variables include prospective customer gender, age, average income, education level, cultural affiliations and ethnicity, for examples. Census data is one source of demographic data. This is not an exhaustive list.

The location of competitors, parking, square footage, rental rates, lease rates, nearby stores, location of other stores, spending patterns of customers, product mix, product locations, product brands, etc. are all useful indicators. The value of any particular indicator, or composite indicator, depends on the type of business that seeks an optimal location. Likewise, given an available location, such indicators can also be used to determine an optimal business type.

Presenting predictions from numerous heterogeneous data sources can be accomplished on a spreadsheet, but often relationships between important data is lost or not recognized when spreadsheet or other non-user-friendly output is used. According to one aspect of the invention, a prediction about business locations is presented on a spatial map having a spatial grid. According to another aspect of the invention, the spatial grid includes a heat map overlying the spatial grid to indicate preferred regions on the spatial grid where an optimal business location could be situated. Additionally the prediction may be displayed via a set of points on the spatial grid, each point being representative of a business location. Some of the points can include icons to designate a particularly relevant attribute of a business location.

Numerous ways of analyzing data exist. One way suited to automatically finding relationships from heterogeneous data sources, which can be displayed on a spatial map includes principal component analysis. Another way of extracting relationships using correlation analysis. Mutual information from heterogeneous data sources can also be relied upon. A discussion of ways to classify entity (business or customer) data, is presented in published U.S. patent application Ser. No. 09/917,409, entitled System and Method for Comparing Populations of Entities, which is incorporated herein by reference.

Machine learning is applied to facilitate the step of analyzing heterogeneous data sources and making predictions. Optimally, the step of creating and using composite indicators includes learning the composite indicators from the data. Useful composite indicators include revenue per square foot, sales per unit time, and sales per unit time per age bracket. Testing the composite indicators assures usefulness.

Heterogeneous data includes structured data fields reflective of demographics including traffic patterns, real estate costs, and competitive business information. Unstructured data may have a textual component, or may be primarily text. For example, newspaper articles referencing a particular region, shopping center or particular location may be useful in formulating a composite indicator relating to popularity, or customer familiarity, for a possible business location.

Data sources may include data tables and the step of analyzing the heterogeneous data sources for integrity includes determining how well one data table relates to another data table. Additionally the step of analyzing data for quality includes determining whether the contents of a data table have been re-characterized over time. Further, the step of analyzing heterogeneous data sources for quality includes cleansing the contents of a data table. These steps assure that data used for predictions is not misleading.

Data normally includes a data source and data elements. The invention includes attributing a relevancy score for each data source, and attributing a relevancy score for each data element. The step of attributing the relevancy of each data element is computed using linear correlation measures. The relevancy score for each data source is calculated to be a weighted sum of scores of each data element in the data source. The step of attributing the relevancy score of each data element is computed using linear correlation measures. Further the invention provides a method for identifying profitability drivers for a business. The method for identifying profitability drivers may be understood substantially in similar manner as described in this document.

Figure 13:
FIG. 13 is a spatial map including a heat map.

FIG. 13 shows a spatial map 1320. The spatial map 1320 is a hybrid map including a satellite view with street names overlaid on street locations. A variety of colored regions 1322, 1324, 1326, 1328 define a set of layered heat maps included on the spatial map 1320. The regions 1322, 1324, 1326 and 1328 are rectangular, but may assume any form of complex polygon, or curved shape. Regions 1324 and 1326 are colored red, indicating predicted optimal regions for business locations. The regions 1322 and 1328 are relatively cooler shades of blue indicating less optimal, but possible, regions predicted for business locations. Special callouts 1330 and 1336 denote particularly desirable addresses based on the predictive output of the algorithm. The translucence of each region map denotes the degree of certitude that the algorithm has for the prediction. Whether a curve, polygon or other shape is used to indicate preferred regions on a heat map, a rank-ordered list of possible business locations can be superimposed on the spatial map, spatial grid, or heat-map to better facilitate business location decision-making.

Figure 14:
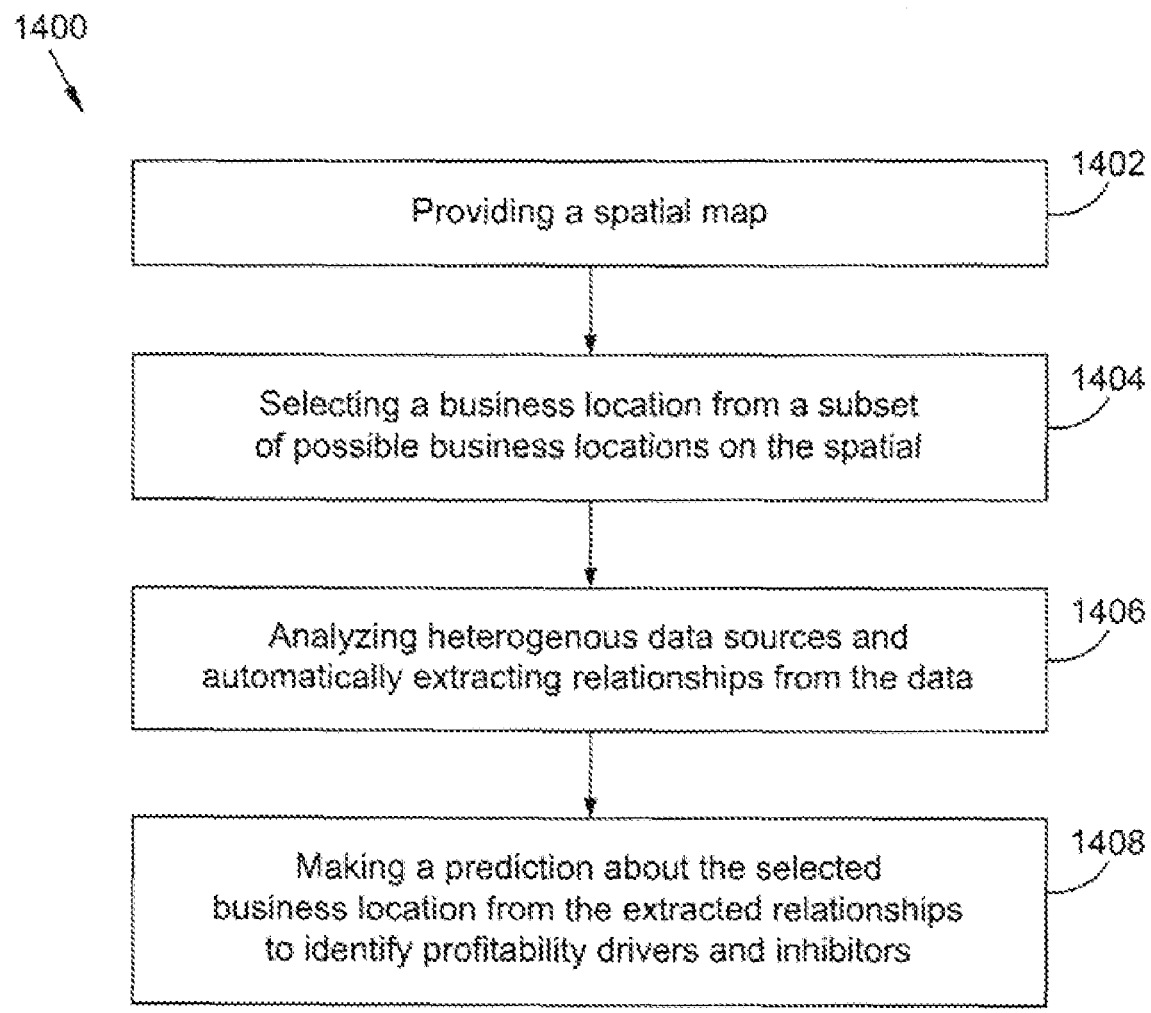
FIG. 14 is a method of making a prediction about business locations on a spatial map.

FIG. 14 shows a method 1400 of making a prediction about business locations on a spatial map. The method 1400 includes the step 1402 of providing a spatial map having grid, the step 1404 of selecting a business location from a subset of possible business locations on the spatial map, the step 1406 of analyzing heterogeneous data sources having data, and automatically extracting relationships from the data, and the step 1408 of making a prediction about the selected business location from the extracted relationships to identify profitability drivers and inhibitors.

Figure 15:
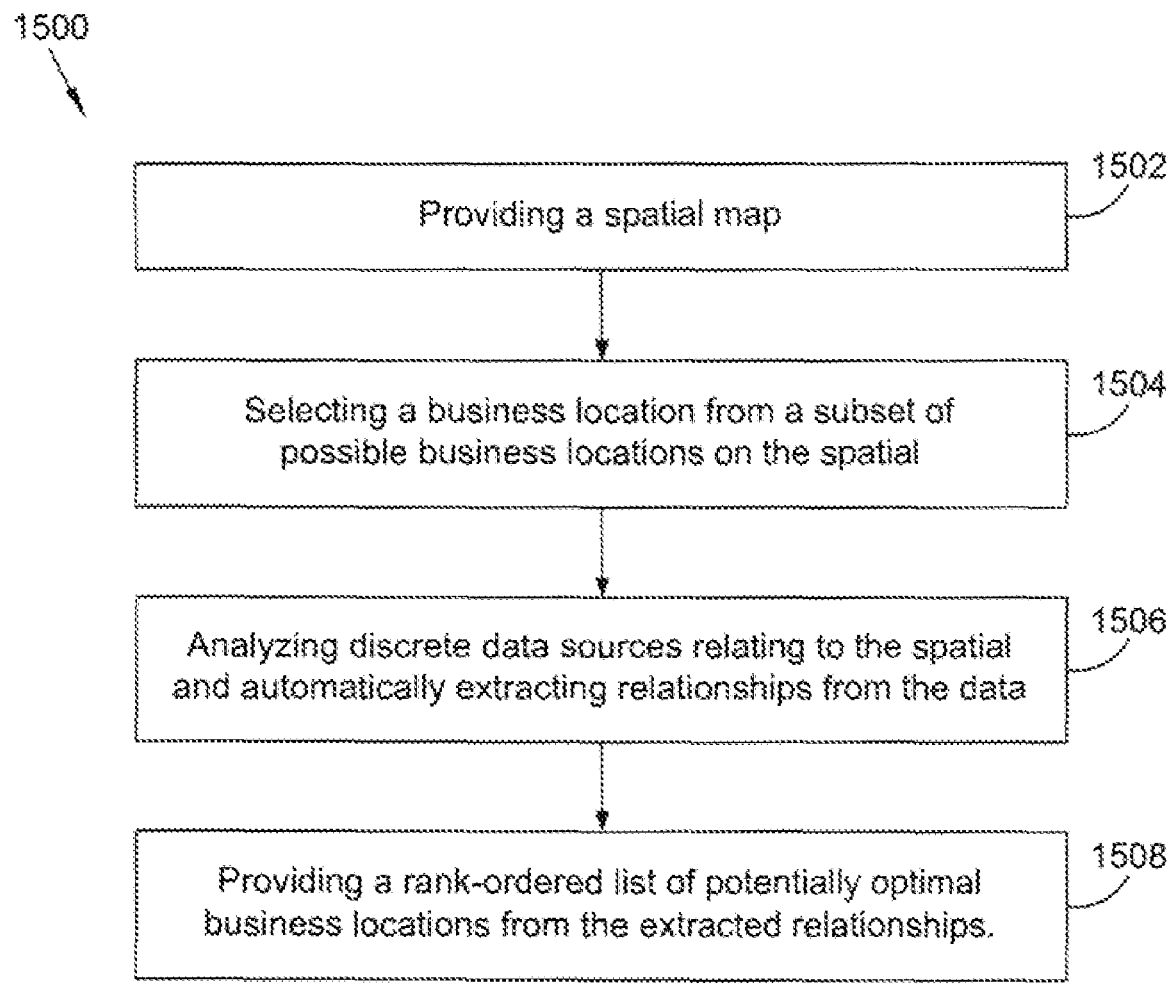
FIG. 15 shows a method of providing rank-ordered list of potentially optimal business locations.

FIG. 15 shows a method 1500 of providing rank-ordered list of potentially optimal business locations. The method 1500 includes the step 1502 of providing a spatial map having a grid, the step 1504 of selecting a business location from a subset of possible business locations on the map, the step 1506 of analyzing heterogeneous data sources relating to the map and automatically extracting relationships from the data, and the step 1508 of providing a rank-ordered list of potentially optimal business locations from the extracted relationships.

While the present invention is disclosed in terms of exemplary embodiments, it can be appreciated that the methods of the present invention can be practiced in a number of ways as defined by the scope of the appended claims. Additionally various features of the system of the present invention can be modified in a myriad of ways to achieve the goals of the invention, which include making a prediction about at least one business location from the extracted relationships using a spatial map.

Figure 16:
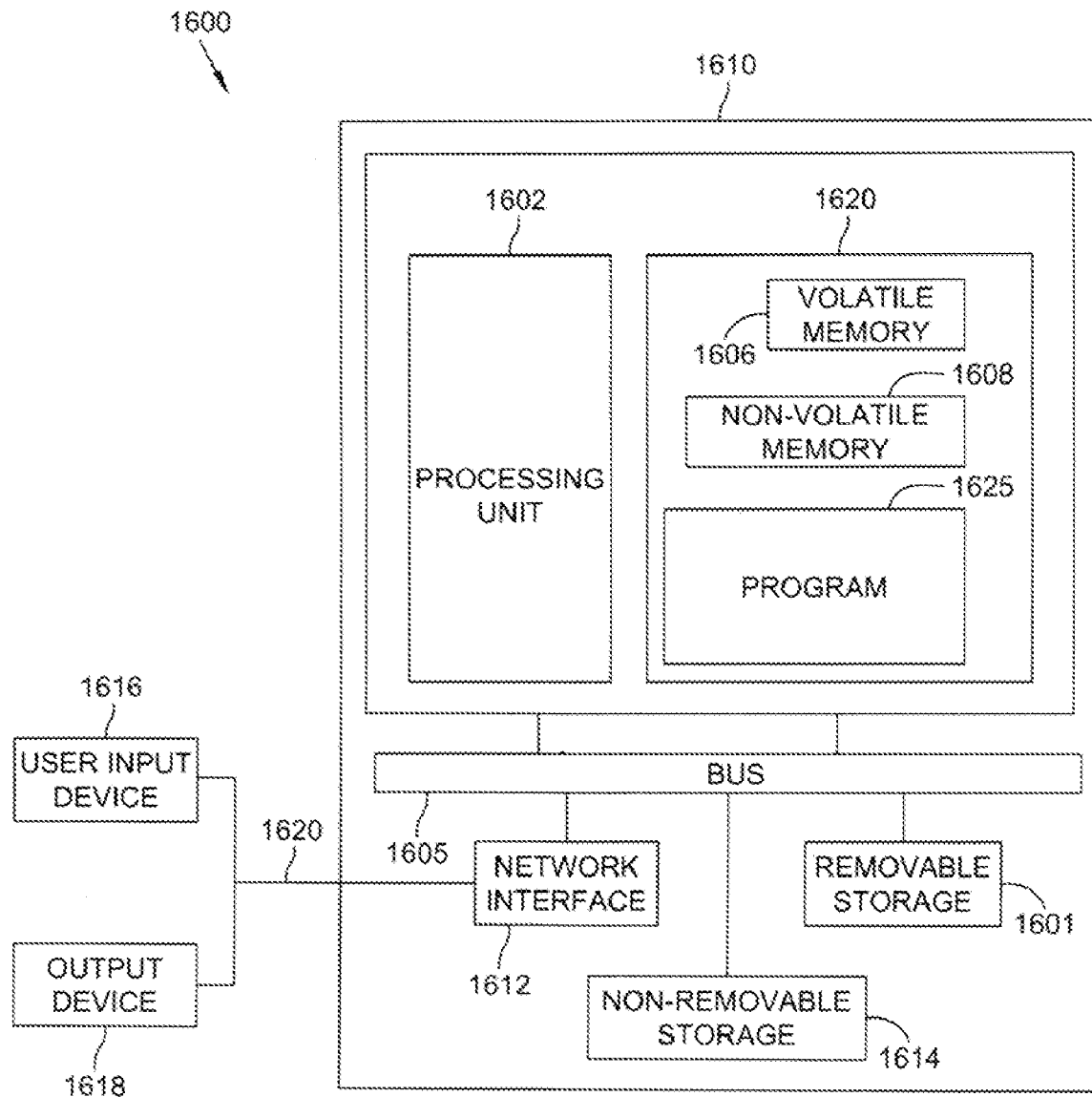
FIG. 16 is a system for implementing the present invention.

FIG. 16 shows an example of a suitable computing system environment 1600 for implementing embodiments of the present invention. FIG. 16 and the following discussion are intended to provide a brief, general description of a suitable computing environment in which certain embodiments of the inventive concepts contained herein may be implemented.

A general computing device, in the form of a computer 1610, may include a processor 1602, memory 1604, removable storage 1601, and non-removable storage 1614. Computer 1610 additionally includes a bus 1605 and a network interface 1612.

Computer 1610 may include or have access to a computing environment that includes one or more user input devices 1616, one or more output devices 1618, and one or more communication connections 1620 such as a network interface card or a USB connection. The one or more output devices 1618 can be a display device of computer, computer monitor, TV screen, plasma display, LCD display, display on a digitizer, display on an electronic tablet, and the like. The computer 1610 may operate in a networked environment using the communication connection 1620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1604 may include volatile memory 1606 and non-volatile memory 1608. A variety of computer-readable media may be stored in and accessed from the memory elements of computer 1610, such as volatile memory 1606 and non-volatile memory 1608, removable storage 1601 and non-removable storage 1614. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, flash memory and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the abovementioned storage media are executable by the processing unit 1602 of the computer 1610. For example, a program module 1625 may include machine-readable instructions capable performing step for utilizing OLAP to optimize business location selection according to the present invention. In one embodiment, the program module 1625 may be included on a CD-ROM and loaded from the CD-ROM to a hard drive in non-volatile memory 1608. The machine-readable instructions cause the computer 1610 to encode according to the various embodiments of the present invention. The invention further teaches a computer readable medium that includes instructions for performing steps according to the present invention. The computer readable medium can be implemented in hardware, firmware or software according to present invention.

Thereby, above description provides a method and system that utilizes an OLAP graph data structure for making predictions about business locations. The method includes providing a spatial map and analyzing heterogeneous data having a spatial component to find utilizable data. Relationships are automatically extracted from the utilizable data by employing machine learning. The step of automatically extracting relationships includes generating a composite indicator, which correlates spatial data with unstructured data. The extracted relationships are presented on a spatial map to make a prediction about at least one business location. Preferably, the predictions are presented as a rank-ordered list on the spatial map and a heat map overlays the spatial map to indicate predictions about particular regions.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A computer system comprising:
   a processing unit; and
   a memory coupled to the processor, the memory having stored therein a code for performing the steps of:
   providing a spatial map;
   analyzing heterogeneous data having a spatial component to find utilizable data and storing the utilizable data in an On Line Analytical Processing data structure;
   extracting relationships from the utilizable data;
   using the extracted relationships to make a prediction about at least one business location; and
   presenting the prediction on the spatial map.

2. A computer-readable medium operable with a computer system, the computer-readable medium having stored instructions for performing the steps of:
   providing a spatial map;
   analyzing heterogeneous data having a spatial component to find utilizable data and storing the utilizable data in an On Line Analtytical Processing data structure;
   extracting relationships from the utilizable data;
   using the extracted relationships to make a prediction about at least one business location; and
   presenting the prediction on the spatial map
   wherein the computer readable medium is implemented in hardware.

3. A computer-readable medium operable with a computer system, the computer-readable medium having stored instructions for performing the steps of:
   providing a spatial map;
   analyzing heterogeneous data having a spatial component to find utilizable data and storing the utilizable data in an On Line Analytical Processing data structure;
   extracting relationships from the utilizable data;
   using the extracted relationships to make a prediction about at least one business location; and
   presenting the prediction on the spatial map
   wherein the computer readable medium is implemented in firmware.

\* \* \* \* \*